(12) United States Patent
Choi et al.

(10) Patent No.: US 8,265,233 B2
(45) Date of Patent: Sep. 11, 2012

(54) METHOD FOR PROVIDING EARLY-MEDIA SERVICE BASED ON SESSION INITIATION PROTOCOL

(75) Inventors: Wooyong Choi, Anyang-si (KR); Sung Kim, Seongnam-si (KR); Sangyun Lee, Seongnam-si (KR)

(73) Assignee: SK Telecom Co., Ltd., Seoul (KR)

( * ) Notice: Subject to any disclaimer, the term of this patent is extended or adjusted under 35 U.S.C. 154(b) by 530 days.

(21) Appl. No.: 12/494,499

(22) Filed: Jun. 30, 2009

(65) Prior Publication Data
US 2009/0262908 A1 Oct. 22, 2009

Related U.S. Application Data

(63) Continuation of application No. 12/303,457, filed as application No. PCT/KR2007/002709 on Jun. 4, 2007.

(30) Foreign Application Priority Data

Jun. 9, 2006 (KR) .......................... 10-2006-0051814
Jun. 9, 2006 (KR) .......................... 10-2006-0051815

(51) Int. Cl.
*H04M 1/64* (2006.01)
*H04L 12/66* (2006.01)

(52) U.S. Cl. .......... 379/87; 370/235; 370/277; 370/338; 370/352; 370/390; 375/240.12; 379/207.02; 379/207.16; 379/215.01; 455/406; 455/414.3; 455/518; 455/519; 704/270.1; 709/204; 709/217; 709/227; 709/228; 709/232; 725/34

(58) Field of Classification Search .................. 370/277, 370/352, 356, 338, 235, 390; 379/87, 207.16, 379/207.02, 215.01; 709/204, 227, 228, 709/217, 218, 232; 455/406, 518, 519, 414.3; 704/270.1; 375/240.12; 725/34
See application file for complete search history.

(56) References Cited

U.S. PATENT DOCUMENTS 6,192,363 B1 * 2/2001 Yasumura ..................... 709/218
(Continued)

FOREIGN PATENT DOCUMENTS

KR 10-2005-0067913 7/2005
(Continued)

OTHER PUBLICATIONS

European Search Report mailed May 27, 2009 for Application No. EP 09150604.8.
(Continued)

*Primary Examiner* — Gerald Gauthier
(74) *Attorney, Agent, or Firm* — Lowe Hauptman Ham & Berner, LLP

(57) ABSTRACT

The present invention relates to a method of providing an early media service based on a session initiation protocol (SIP), wherein early media of a multimedia form can be provided under SIP-based B2BUA mode operation. According to the present invention, in a case where early media are provided to an originating terminal when a call connection with a terminating terminal is established at the request of the originating terminal, the early media is provided in the form of multimedia data, such as text, image, moving image, flash animation and the like, as well as audio data, and thus users desires are fulfilled and users satisfactions are maximized. In addition, with individual operation management of the terminating terminal and the originating terminal according to B2BUA mode operation based on the session initiation protocol and an early session initiation with the originating terminal, an early media service can be normally provided to the originating terminal even when the terminating terminal is in an abnormal operation state.

19 Claims, 3 Drawing Sheets

U.S. PATENT DOCUMENTS

| | | | |
|---|---|---|---|
| 6,760,916 B2* | 7/2004 | Holtz et al. | 725/34 |
| 7,042,871 B2* | 5/2006 | Gallant et al. | 370/352 |
| 7,139,380 B2* | 11/2006 | Burger | 379/207.02 |
| 7,339,104 B2* | 3/2008 | Oshiyama et al. | 84/602 |
| 7,508,821 B2* | 3/2009 | Kennedy | 370/352 |
| 7,509,425 B1* | 3/2009 | Rosenberg | 709/227 |
| 7,610,395 B2* | 10/2009 | Kawasaki et al. | 709/232 |
| 7,613,287 B1* | 11/2009 | Stifelman et al. | 379/215.01 |
| 7,715,320 B2* | 5/2010 | Huh | 370/235 |
| 7,839,990 B2* | 11/2010 | Lee | 379/207.16 |
| 7,873,378 B2* | 1/2011 | Schliwa-Bertling et al. | 455/519 |
| 7,894,521 B2* | 2/2011 | Hannuksela | 375/240.12 |
| 7,920,562 B2* | 4/2011 | Patel | 370/390 |
| 7,945,636 B2* | 5/2011 | Nelson et al. | 709/217 |
| 8,032,127 B2* | 10/2011 | Paila et al. | 455/414.3 |
| 2003/0187658 A1* | 10/2003 | Selin et al. | 704/270.1 |
| 2004/0081304 A1 | 4/2004 | Lee | |
| 2006/0072526 A1* | 4/2006 | Rasanen | 370/338 |
| 2007/0121595 A1* | 5/2007 | Batni et al. | 370/356 |
| 2007/0123284 A1* | 5/2007 | Schliwa-Bertling et al. | 455/518 |
| 2007/0263599 A1* | 11/2007 | Itzkovitz et al. | 370/352 |
| 2008/0201483 A1* | 8/2008 | Chong et al. | 709/228 |
| 2008/0240375 A1* | 10/2008 | Chen | 379/87 |
| 2008/0285487 A1* | 11/2008 | Forslow et al. | 370/277 |
| 2008/0311883 A1* | 12/2008 | Bellora et al. | 455/406 |
| 2009/0055473 A1* | 2/2009 | Synnergren | 709/204 |
| 2009/0252153 A1* | 10/2009 | Choi et al. | 370/352 |
| 2009/0262908 A1* | 10/2009 | Choi et al. | 379/87 |
| 2010/0017518 A1* | 1/2010 | Holmberg | 709/227 |
| 2010/0197335 A1* | 8/2010 | Jin et al. | 455/518 |

FOREIGN PATENT DOCUMENTS

| | | |
|---|---|---|
| KR | 10-2005-0080780 | 8/2005 |
| KR | 10-2006-0010590 | 2/2006 |
| KR | 10-2006-0017687 | 2/2006 |
| KR | 10-2006-89795 | 8/2006 |
| KR | 10-2007-0118003 | 12/2007 |
| KR | 10-2007-118004 | 12/2007 |

OTHER PUBLICATIONS

LM Ericsson, "DISC Early media using multiple dialogs", *3GPP Draft; N1-050184, 3rd Generation Partnership Project (3GPP), Mobile Competence Center*, Sydney, Australia, Feb. 14, 2004, pp. 1-4.

J. Rosenberg et al., Best Current Practices for Third Party Call Control (3pcc) in the Session Initiation Protocol (SIP), *IETF Standard, Internet Engineering Task Force*, Apr. 1, 2004, pp. 1-31.

G. Camarillo et al., "Early Media and Ringing Tone Generation in the Session Initiation Protocol(SIP)", *IETF Standard, Internet Engineering Task Force*, Dec. 1, 2004, pp. 1-13.

J. Rosenberg, "SIP Early Media", *IETF Standard-Working-Draft, Internet Engineering Task Force*, Jul. 13, 2001, pp. 1-23.

"Telecommunications and Internet Converged Services and Protocols for Advanced Networking (TISPAN); Common Basic Communication Procedures; Protocol Specification", ETSI TS 183 028, V1.1.1, Apr. 1, 2006, pp. 1-36.

International Search Report mailed Sep. 5, 2007 for PCT/KR2007/002709.

* cited by examiner

[FIG 1]
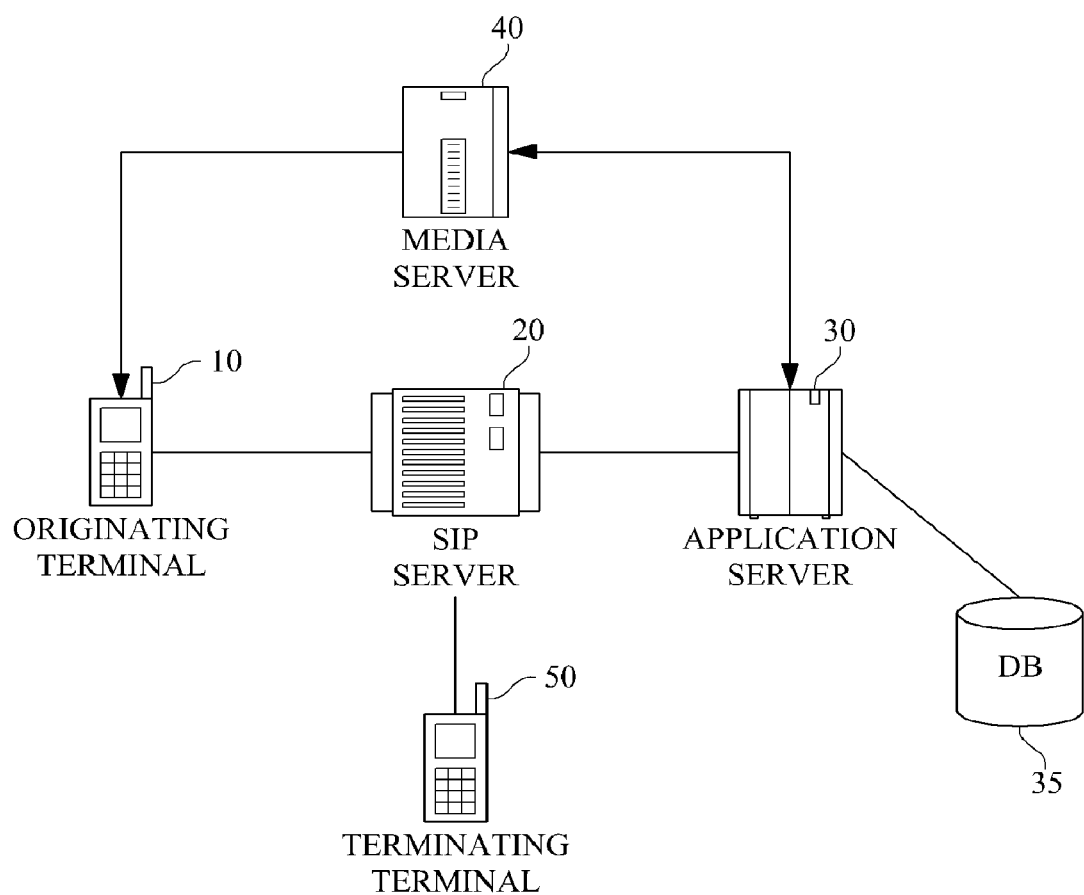

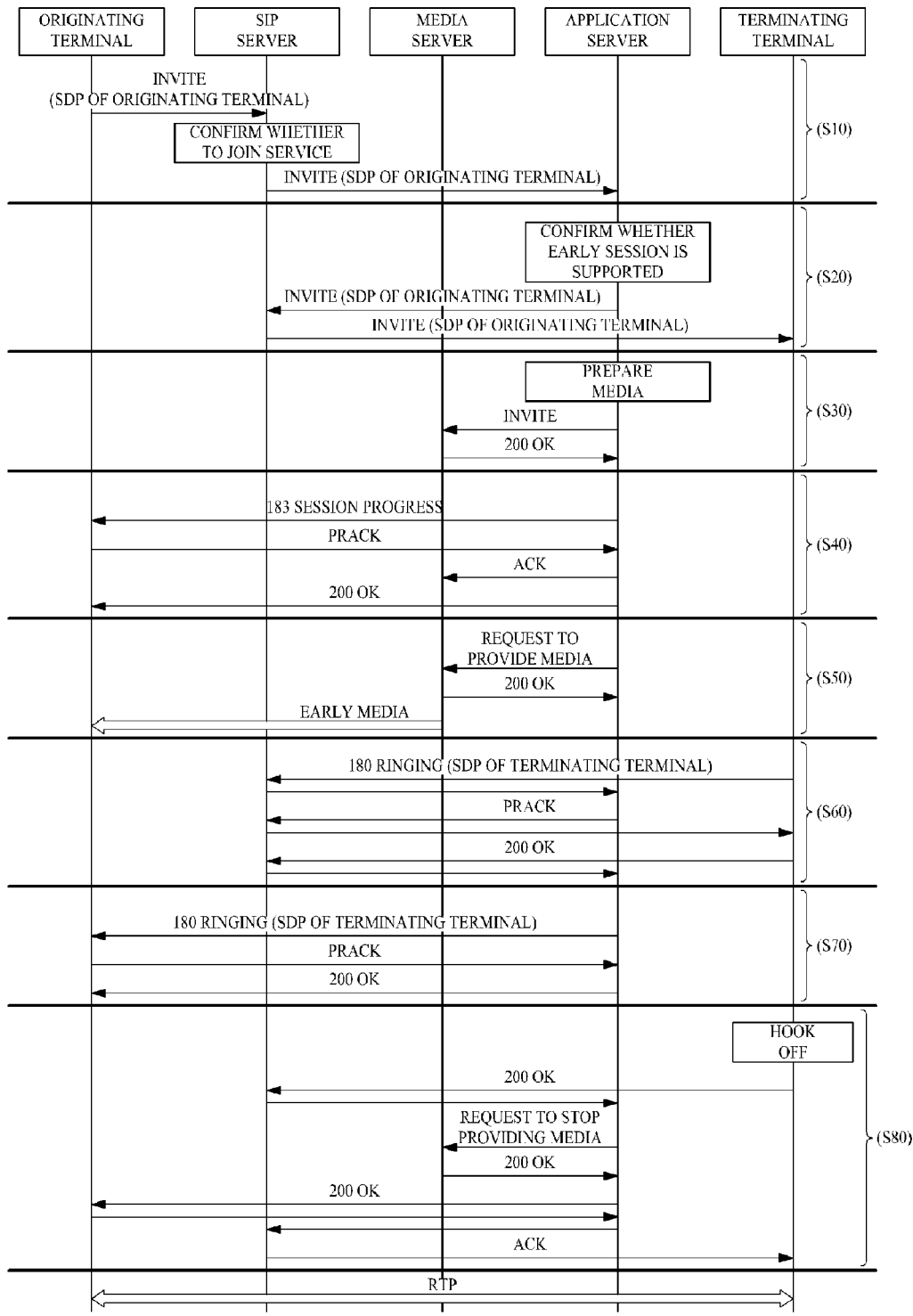

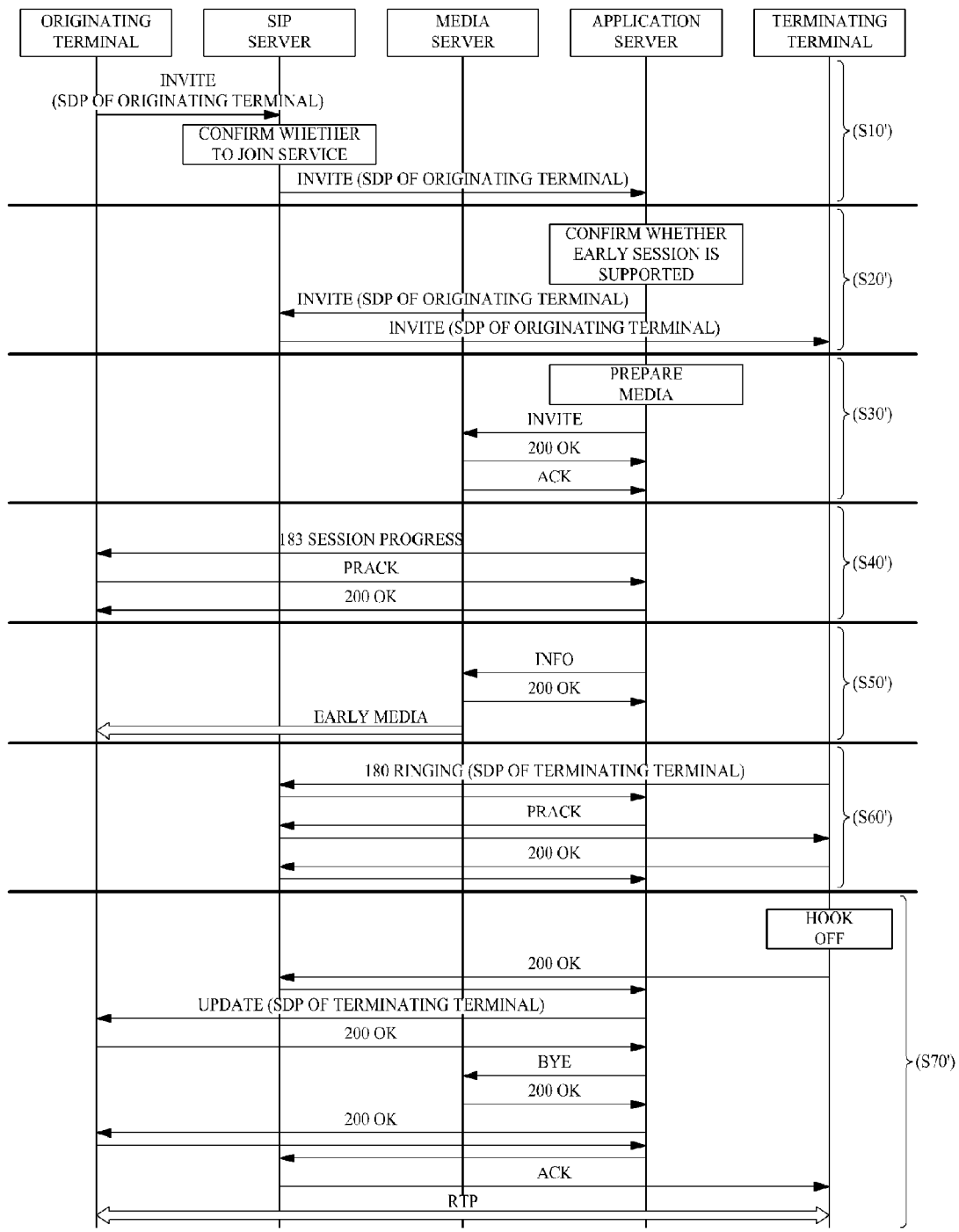
[FIG 3]

METHOD FOR PROVIDING EARLY-MEDIA SERVICE BASED ON SESSION INITIATION PROTOCOL

CROSS REFERENCE TO RELATED APPLICATION

This application claims the priority of Korean Patent Application No. 10-2006-0051814, filed on Jun. 9, 2006 and the priority of Korean Patent Application No. 10-2006-0051815, filed on Jun. 9, 2006 in the KIPO (Korean Intellectual Property Office), the disclosure of which are incorporated herein in their entirety by reference. Further, this application is the National Phase application of International Application No. PCT/KR2007/002709, filed Jun. 4, 2007, which designates the United States and was published in English, and the Continuation of U.S. patent application Ser. No. 12/303,457, filed Dec. 4, 2008. Each of these applications is hereby incorporated by reference in their entirety into the present application.

TECHNICAL FIELD

The present invention relates to a method of providing an early media service based on a session initiation protocol (SIP), and more particularly, to a method of providing an early media service based on SIP, wherein an application server and a media server can provide early media of a multimedia form, such as images, moving images and the like, as well as audios, using an early session or a regular session.

BACKGROUND ART

As mobile communication subscribers rapidly increase in number, service providers providing mobile communication services adopt a variety of additional services in order to attract customers and enhance quality of service for users, and provide an early media service, such as a ring back tone service, as one of such services.

The early media service is a service for providing media instead of a dial tone to an originating terminal, from a point when a call connection is tried until a connection is established and a communication is started, when a transmitting side places a call to a receiving side, i.e., the originating terminal tries a call connection to a subscriber number of the receiving side.

Such an early media service can function as means for representing an image or highlighting a characteristic of a receiving or transmitting subscriber. Therefore, instead of a ring back tone of a uniform mechanical tone conventionally provided to a service user, services that allow subscribers, particularly terminating subscribers, to change a ring back tone according to their tastes tends to be variously introduced recently. Such services are configured to output a ring back tone selected by a subscriber, instead of a conventional ring back tone, when a transmitter tries a communication.

However, although a variety of ring back tones based on the selection of a subscriber is provided instead of a conventional uniform ring back tone, media provided as a ring back tone are limited to audio data, such as a voice or music. Therefore, there is a limitation in fulfilling further higher desire of a user of a mobile communication terminal that can implement high quality audio and video owing to recent development of mobile communication terminal techniques.

In addition, the conventional early media service described above is a method using a circuit network, which has a problem in that due to the nature of the circuit network in which a circuit is exclusively used until a call connection is released, a circuit is exclusively used even when data is intermittently transmitted, and thus resources of the circuit is extremely wasted.

In addition, the conventional service method has a problem in that after an early service is provided, when the session is switched to another session to transmit and receive media to and from a counterpart terminal, the burden of a corresponding mobile communication terminal is heavy in the process of negotiating terminal capacity of a corresponding session and handling the session switch.

Accordingly, in providing an early media service, a variety of media for satisfying further higher desire of a user should be provided, together with a technique according thereto.

DISCLOSURE

Technical Problem

The present invention is conceived to solve the aforementioned problems. An object of the present invention is to provide a method of providing an early media service based on SIP, in which early media to be provided are not simply limited to audio data, such as a voice or the like, but there can be provided various forms of media, such as a moving image, flash animation or the like.

In addition, another object of the present invention is to provide a method of providing an early media service based on back-to-back user agent (B2BUA) mode operation, in which an Internet protocol (IP) packet network based on SIP is used instead of a circuit network to thereby maximize efficiency of circuit resources.

Particularly, a still object of the present invention is to provide an early media service, in which an early media service scheme for a terminal that does not support an early session is prepared, thereby allowing the terminal that does not support an early session to be normally provided with the early media service through a regular session.

Technical Solution

The present invention for achieving the object provides a method of providing an early media during a session initiation protocol (SIP) based call connection between an originating terminal and a terminating terminal, the method comprising: receiving an invite message containing a first session description protocol (SDP) information from the originating terminal, and transmitting the invite message to the terminating terminal; receiving a message containing the second SDP information from the terminating terminal that receives the invite message; providing the second SDP information to the originating terminal; acquiring media information of contents for the early media, and transmitting a message containing the acquired media information to the originating terminal; providing the early media to the originating terminal; and after receiving a call response message from the terminating terminal, stopping transmitting the early media to the originating terminal and establishing the call between the originating terminal and the terminating terminal.

In addition, the present invention for achieving the object provides an application server for providing an early media during a session initiation protocol (SIP) based a call connection between an originating terminal and a terminating terminal, the application server capable of performing: receiving an invite message containing a first session description protocol (SDP) information from the originating terminal, and transmitting the invite message to the terminating terminal;

receiving a message containing the second SDP information from the terminating terminal that receives the invite message; providing the second SDP information to the originating terminal; acquiring media information of contents for the early media, and transmitting a message containing the acquired media information to the originating terminal; instructing to provide the early media to the originating terminal; and after receiving a call response message from the terminating terminal, stopping transmitting the early media to the originating terminal and establishing the call between the originating terminal and the terminating terminal.

DESCRIPTION OF DRAWINGS

FIG. 1 is a block diagram showing an early media service providing system according to an embodiment of the present invention;

FIG. 2 is a flowchart sequentially showing a method of providing an early media service for a terminal that supports an early session according to an embodiment of the present invention; and FIG. 3 is a flowchart sequentially showing the method of providing an early media service for a terminal that does not support an early session according to an embodiment of the present invention.

BEST MODE

Hereinafter, a method of providing an early media service based on SIP according to an embodiment of the present invention will be described in more detail with reference to the accompanying drawings.

Before describing the present invention in detail, a session initiation protocol configuring the present invention will be described first. The session initiation protocol is a very simple text-based application layer control protocol, which is a signaling protocol that allows one or more participants to initiate, update and terminate a session together. The session initiation protocol provides flexibility and extensibility, through which the session initiation protocol can be combined with many other protocols and create a variety of services. For example, information on a session is provided to an interesting group, and a counterpart who desires to talk is invited to participate in the session through the session initiation protocol. Thus, information on the type of media desired to be opened is exchanged with the counterpart through a session description protocol (SDP). In addition, real-time multimedia services can be provided using a real-time transport protocol described in the session description protocol.

FIG. 1 shows an early media service providing system based on the session initiation protocol according to the present invention. As shown in the figure, the early media service providing system comprises an SIP server, an application server, and a media server.

The respective constitutional elements configuring the early media service providing system according to the present invention will be described in detail. First, the originating terminal 10, which is a terminal receiving the early media service according to the present invention, is preferably provided with performance to the extent of receiving early media in a multimedia form and executing the received early media. That is, the originating terminal should be able to receive and execute multimedia data, such as text, images, moving images, flash animations and the like, as well as voice and audio data that has been provided as conventional early media, thereby informing an originating terminal subscriber that a call connection request to a terminating terminal is in progress through corresponding multimedia data.

The terminating terminal 50 is a terminal of a subscriber who has previously joined a corresponding service in order to receive an early media service according to the present invention. When the originating terminal requests a call connection, the terminating terminal sets service information for providing early media to the originating terminal until the call connection is established. The SIP server 20 is an apparatus for performing message routing between the originating terminal 10 or the terminating terminal 50 and the application server 30. For example, the SIP server transmits an INVITE message received from the originating terminal to the application server, and transfers an INVITE message received from the application server to the terminating server.

In addition, when the SIP server receives an INVITE message from the originating terminal 10, the SIP server may confirm whether the subscriber of the terminating terminal that receives the corresponding message has joined the early media service. In this case, if the terminating terminal subscriber has not joined the early media service according to the present invention, the SIP server performs a process for providing conventional early media to the corresponding originating terminal. Here, the present invention will be described in consideration of only a case where a terminating terminal subscriber has joined the early media service according to the present invention. The application server 30 individually processes and manages operation of the originating and terminating terminals in the session initiation protocol through B2BUA mode operation, and transmits and receives messages to and from the media server and performs a session initiation process with the originating terminal so that early media according to service setting information of the terminating terminal subscriber can be provided to the originating terminal through an early/regular session.

In the present invention, a session for providing early media can be classified into an early session and a regular session. Here, the early session is an additional session, which is distinguished from the regular session, for providing an early media service, while the regular session is a session for performing a regular media communication (conversation) with a counterpart terminal. In the present invention, if the originating terminal does not support an early session, early media are provided through a general regular session regardless of the additional early session. If the terminal supports an early session, early media are provided through an early session that is initiated through a separate session negotiation process.

To this end, the application server of the present invention confirms whether a corresponding originating terminal supports an early session by analyzing the header information of an INVITE message received from the originating terminal, whereby it is determined whether to provide the service through an early session.

In addition, when transmitting an INVITE message to a terminating terminal, the application server supports B2BUA mode operation of the session initiation protocol, so that the INVITE message transmitted to the terminating terminal can be processed independently from the management of the originating terminal. Thereafter, the application server synchronizes operation of the originating and terminating terminals, which are separately processed under the B2BUA mode operation.

Here, the application server inquires service setting information of a corresponding terminating terminal subscriber and network setting information in order to provide early media according to the selection of the terminating terminal subscriber. Accordingly, it is preferable to additionally provide a storage server for storing the service setting information of the terminating terminal subscriber and the network setting information.

The media server 40 is an apparatus for transmitting and receiving messages to and from the application server and providing early media to the originating terminal. Specifically, the media server provides media information for providing services through message communication with the application server and provides early media services to a corresponding originating terminal under instructions from the application server to provide media.

Next, referring to FIGS. 2 and 3, a method of providing an early media service using the early media service providing system will be described.

First, FIG. 2 is a flowchart sequentially showing a method of providing an early media service for a terminal that supports an early session according to an embodiment of the present invention.

As shown in the figure, if an originating terminal creates an INVITE message for establishing a call connection with a terminating terminal and transmits the INVITE message to the SIP server, the SIP server that receives the INVITE message routes the received INVITE message to the application server after confirming whether a terminating terminal subscriber, which is the target of the INVITE message, has joined the service by analyzing the received INVITE message (step S10).

At this time, the INVITE information transmitted by the originating terminal can contain, for example, the IP address of the originating terminal, information on the terminating terminal, a service processing identifier, SDP information of the originating terminal, and the like. Here, the IP address of the originating terminal means an address value for identifying the originating terminal when a communication is performed based on TCP/IP, and the terminating terminal information can be a phone number or the like of the terminating terminal. In addition, the service processing identifier is a value indicating whether the originating terminal according to the present invention supports an early session. Thereafter, whether to initiate an early session is determined through such a value.

In the meantime, the service described here is a service for providing an early media service according to the present invention, which determines whether to provide early media of a multimedia form. When the terminating terminal subscriber has not joined the service, a process of providing an early media service according to a prior art is performed. In addition, if the terminating terminal subscriber has joined the service, a next step for providing early media of a multimedia form is processed.

In this manner, although in the present invention, the SIP server confirms whether the terminating terminal subscriber has joined the service, the early media service of the present invention can be provided regardless of whether the terminating terminal subscriber has joined the service. In this case, the SIP server will perform only a routing function.

Next, the application server that receives the INVITE message from the SIP server analyzes the header information of the corresponding INVITE message and confirms whether the originating terminal supports an early session based on the service processing identifier, and then transmits an INVITE message containing SDP information of the originating terminal to the terminating terminal through the SIP server (step S20).

That is, the application server determines whether the originating terminal supports an early session by confirming the service processing identifier, which indicates whether an early session is supported, is contained in the INVITE message header, and transmits an INVITE message to the terminating terminal through B2BUA mode operation of the SIP.

Here, the B2BUA mode causes the originating terminal and the terminating terminal to be separated, and their operations to be individually processed and managed. A proxy server of a general session initiation protocol receives a request message, and processes a response to the received message or routes a corresponding message to a next apparatus. Contrarily, in the B2BUA mode, the application server receives a request message, and then modifies the corresponding message or transfers the message to a final destination in another form. The application server in the B2BUA mode transmits the INVITE message received from the SIP server to the terminating terminal through a channel that is separated from the one used for processing the operation of the originating terminal, and thereafter, individual operations of the originating and terminating terminals are processed in synchronization with the application server.

After transmitting the INVITE message to the terminating terminal, the application server inquires service setting information of the terminating terminal subscriber and acquires media information of the terminating terminal subscriber by transmitting and receiving messages to and from a corresponding media server according to the confirmation of the network setting information (step S30).

Here, the process of inquiring the setting information includes the process of inquiring a service profile database (DB) of a corresponding service subscriber, i.e., the terminating terminal subscriber, confirming a basic sound source (contents), a sound source of each transmitter or transmitter group, a sound source of each time slot, or the like, and confirming identification (ID) of contents to be provided as early media to a current corresponding transmitter. In addition, the process of confirming network setting information includes a process of confirming the location of a media server where corresponding contents to be provided as early media to the transmitter are stored.

The application server that acquires the service setting information and the network setting information through the aforementioned process transmits an INVITE message to a corresponding media server. At this time, the INVITE message contains contents ID acquired on the basis of the service setting information, through which the application server requests media information, such as a contents format of the contents to be provided.

The media server that receives the INVITE message from the application server includes media information as a response to the received INVITE message, i.e., SDP information of the provided media, such as a contents format, into a 200 OK message, and then transmits the 200 OK message to the application server, Next, the application server that acquires the media information needed for providing services from the media server performs an early session initiation process for providing an early media service to the originating terminal (step S40).

Specifically, the application server transmits a 183 session progress message corresponding to an early session offer to the originating terminal in order to initiate an early session. At this time, the application server transmits a corresponding message containing the media information acquired from the media server.

The originating terminal that receives the 183 session progress message performs an early session negotiation process on the basis of the media information contained in the message. Specifically, first, the originating terminal transmits to the application server a provisional acknowledgement (PRACK) message containing SDP information of the originating terminal for early media processing, as a response to the 183 session progress message. The PRACK message corresponds to a response to the early session offer.

At this time, the SDP information in the PRACK message contains, such as a codec information and capability information of the originating terminal. More specifically, the SDP information can include capability of processing the codec, which is provided as a piece of media information contained in the 183 session progress message, an IP address assigned to the originating terminal, a port number, and the like.

Along with the transmission of the PRACK message, the originating terminal performs a process of opening a receiving port for media processing in preparation for receiving media from the media server.

Next, the application server that receives the PRACK message from the originating terminal includes the SDP information contained in the PRACK message into an acknowledgement (ACK) message and transmits the ACK message to the media server, and transmits to the originating terminal a 200 OK message as a response to the received PRACK message. At this time, based on the SDP information contained in the ACK message, such as the capacity information of the originating terminal and the like, the media server that receives the ACK message determines media types, formats, and the like that the originating terminal can process.

Thereafter, the application server transmits an INFO message to the media server in order to request the media server to provide early media to the originating terminal, and the media server that receives the INFO message provides early media to the corresponding originating terminal (step S50).

The process of providing early media will be described in detail. First, the application server commands the media server to provide early media to the originating terminal through the INFO message, and the media server that receives the INFO message transmits early media to the originating terminal in response to the command to provide media. In addition, the media server transmits the 200 OK message to the application server in response to the INFO message, thereby performing a response to the corresponding INFO message.

In some cases, without using the INFO message, the media server can start to provide early media to the originating terminal only by receiving the ACK message.

At this time, the early media provided to the originating terminal can be any one of text, audio data, such as for a voice, sound or effect sound, image data, such as for an image, avatar or emoticon, moving image, and flash animation, or a combination thereof. The early media are continuously provided until a call connection is established between the originating terminal and the terminating terminal. In addition, the originating terminal that receives and plays back the media is preferably provided with a function for repetitively playing back the media for a certain time interval to prevent a flickering phenomenon when the received media are played back.

In the meantime, the terminating terminal that receives the INVITE message from the application server in step S20 transmits a 180 ringing message, which indicates ringing in response to the reception of the INVITE message, to the application server through the SIP server (step S60). At this time, the corresponding 180 ringing message contains SDP information of the terminating terminal. If the application server that receives the 180 ringing message stores the SDP information of the terminating terminal and transmits a PRACK message to the terminating terminal in response to the reception of the 180 ringing message, the terminating terminal transmits a 200 OK message to the application server, thereby performing a response to the PRACK message. Here, the transmission of the 180 ringing message of the terminating terminal is performed in correspondence to the reception of the INVITE message transmitted from the application server, and it should not be understood that step S60 is performed after step S50 because of the appearance of the names of the steps. However, the application server can prepare to provide early media to the originating terminal before receiving the 180 ringing message from the terminating terminal, which can solve a problem that early media cannot be immediately provided to the originating terminal due to a response delay of the terminating terminal when the terminating terminal cannot immediately transmit the 180 ringing message owing to the characteristic of a wireless network.

In the meantime, after receiving the 180 ringing message from the terminating terminal, the application server performs a preparatory process for initiating a regular session between the terminating terminal and the originating terminal (step S70). Comparing a regular session with an early session, the early session established in step S40 is a session for providing early media, which is provided until a call connection with the terminating terminal is established in response to a call connection request of the originating terminal, whereas the regular session is a session for transmission and reception of media according to communications between the originating terminal and the terminating terminal after a call connection therebetween is established. The process of preparing the regular session is performed at the same time as the early media are provided to the originating terminal through the early session.

In order to prepare initiation of a regular session, the application server transmits a 180 ringing message containing SDP information of the terminating terminal to the originating terminal, and the originating terminal performs an initiation process for regular session processing based on the received 180 ringing message and simultaneously transmits a PRACK message to the application server in response to the 180 ringing message. The application server that receives the PRACK message transmits the 200 OK message, thereby performing a response to the corresponding PRACK message.

Thereafter, when the terminating terminal subscriber performs an action for a call connection, such as hooking off the receiver or pressing a communication button and thus the terminating terminal responds to the call connection request of the originating terminal, the application server stops transmitting the early media and completes the regular session initiation between the originating terminal and the terminating terminal (step S80).

More specifically, the terminating terminal transmits a 200 OK message to the application server corresponding to a response action of the terminating terminal subscriber. At this time, the 200 OK message, which is a response message corresponding to the INVITE message received from the application server in step S20, means the acceptance of the invitation of the originating terminal.

The application server that receives the 200 OK message, which indicates that the subscriber has responded, from the terminating terminal transmits a BYE message to the media server to stop providing the early media to the originating terminal. The media server that receives the BYE message performs a process for stopping providing the early media to the originating terminal and transmits a 200 OK message as a response to the BYE message to the application server.

Thereafter, the application server transfers the 200 OK message to the originating terminal to inform the originating terminal subscriber that the terminating terminal subscriber has responded, thereby performing a response to the INVITE message received from the originating terminal in step S10. The originating terminal that receives the 200 OK message transmits an ACK message corresponding thereto to the application server. The application server that receives the ACK message from the originating terminal finally transmits the corresponding ACK message to the terminating terminal.

In this manner, a call connection is established between the originating terminal and the terminating terminal, and thereafter, the originating terminal and the terminating terminal perform media communication corresponding to real communication through the regular session. At this time, the media communication is accomplished through a real-time transport protocol (RTP), and RTP filtering is performed when media are transmitted and received through the regular session, and thus any media except from the currently communicating counterpart terminal cannot be received.

That is, when the step of providing early media through an early session is switched to the step of transmitting and receiving media through a regular session, it is probable that early media can be received even after the regular session is initiated or that other media can be received, due to a problem in the network or characteristics of IP traffics. Accordingly, the originating terminal should be provided with a filtering function to avoid such a phenomenon.

In addition, when the step of providing early media is switched to the step of transmitting and receiving media, if a null transmission occurs due to a problem in the process of switching, the originating terminal preferably repeats playing back the received early media or performs a still image processing until a call connection with the terminating terminal is established to solve the null transmission problem occurring according to the session switch.

Next, FIG. 3 is a flowchart sequentially showing the method of providing an early media service for a terminal that does not support an early session according to an embodiment of the present invention, in which an embodiment of providing an early media service using a regular session is shown.

As shown in the figure, if the originating terminal creates an INVITE message for establishing a call connection with the terminating terminal and transmits the INVITE message to the SIP server, the SIP server that receives the INVITE message route the received INVITE message to the application server after confirming whether a terminating terminal subscriber, which is the target of the INVITE message, has joined the service by analyzing the INVITE message received depending on occasions (step S10).

As in the embodiment of FIG. 2, the INVITE message transmitted by the originating terminal can contain the information, such as the IP address of the originating terminal, information on the terminating terminal, a service processing identifier, SDP information of the originating terminal, and the like. At this time, in the embodiment of the present invention in which a terminal support an early session, the INVITE message includes a service processing identifier indicating whether the terminal supports an early session in order to provide a service through the early session separate from a regular session. However, in a case where the service is provided uniformly through a regular session without confirming whether the terminal supports an early session, the service processing identifier may not be contained in the INVITE message or may not be confirmed.

In addition, the early media service of the present invention can be provided only to service subscribers. In this case, if a terminating terminal subscriber has not joined the early media service of the present invention, a process of providing ring back tone media according to a prior art is performed. In case of the terminating terminal subscriber that has joined the service, a step for providing early media of a multimedia form is processed.

The application server that receives the INVITE message from the originating terminal through the SIP server analyzes the header information of the corresponding INVITE message and confirms whether the originating terminal supports an early session based on the service processing identifier, and transmits an INVITE message to the terminating terminal through the SIP server (step S20).

That is, the application server confirms whether the originating terminal supports an early session by confirming whether the service processing identifier, which indicates whether an early session is supported, is contained in the INVITE message header. In this manner, in this embodiment, the application server recognizes that the originating terminal dose not support an early session, and then, transmits an INVITE message to the terminating terminal through B2BUA mode operation of the session initiation protocol, in which operation with the originating terminal is separated from operation with the terminating terminal and the separated operations are individually processed. At this time, the INVITE message transmitted to the terminating terminal contains SDP information of the originating terminal.

Thereafter, the application server inquires service setting information of the terminating terminal subscriber, confirms network setting information, and acquires media information of the terminating terminal subscriber by transmitting and receiving messages to and from a corresponding media server (step S30).

That is, after transmitting the INVITE message from the originating terminal to the terminating terminal, the application server prepares to provide an early media service to the originating terminal. First, the application server inquires a service profile database according as the terminating terminal subscriber joins the service to confirm service setting information of the corresponding subscriber, i.e., a type of contents to be provided to the originating terminal, conditions for providing the contents, and the like, and confirms the network setting information to confirm the location of a corresponding media server.

The application server that acquires the service setting information and the network setting information through the aforementioned process transmits an INVITE message to a corresponding media server. At this time, the INVITE message contains contents ID selected on the basis of the service setting information and SDP information indicating capacity information of the originating terminal. With the INVITE message, the application server requests media information, such as a contents format and the like of the service to be provided.

The media server that receives the INVITE message from the application server determines media information, such as a contents format or the like that the originating terminal can process, based on the SDP information of the originating terminal in the INVITE message, includes the media information into a 200 OK message, and transmits the 200 OK message to the application server.

In the meantime, the application server that receives the 200 OK message on the media information transmits an ACK message to the media server, thereby performing a response to the 200 OK message. The ACK message can be transmitted after a 183 session progress message is transmitted in step S40. Next, the application server that acquires the media information from the media server performs a process of initiating a session with the originating terminal to provide early media (step S40). More specifically, first, the application server transmits a 183 session progress message containing the media information acquired from the media server to the originating terminal in order to initiate a session for providing early media to the originating terminal.

The originating terminal that receives the 183 session progress message opens a receiving port for processing the early media to be received thereafter and transmits a PRACK message to the application server in response to the reception of the 183 session progress message. The application server transmits a 200 OK message for the PRACK message to the originating terminal.

In case of the embodiment shown in FIG. 2, the SDP information of the originating terminal is transmitted using a PRACK message in order to separately negotiate an early session. However, in this embodiment, since the originating terminal does not support an early session and provides an early media service using a regular session, the PRACK message does not contain the SDP information.

If the session initiation process for providing early media is completed in this manner, the application server transmits an INFO message to the media server in order to request the provision of early media to the originating terminal, and the media server that receives the INFO message provides early media to the corresponding originating terminal (step S50).

Specifically, the application server commands the media server to provide early media to the originating terminal through the INFO message, and the media server that receives the INFO message transmits a 200 OK message to the application server, thereby performing a response to the reception of the corresponding INFO message. Along with the transmission of the response message, the application server transmits early media according to the service setting information of the terminating terminal subscriber to the originating terminal according to the command to provide media.

At this time, the early media provided to the originating terminal can be any one of text, audio data, such as for a voice, sound or effect sound, image data, such as for an image, avatar or emoticon, moving image, and flash animation, or a combination thereof. The early media are continuously provided until a call connection is established between the originating terminal and the terminating terminal.

In addition, the originating terminal that receives and plays back the media is provided with a function for repetitively playing back the media for a certain time interval to prevent a flickering phenomenon when the received media are played back.

In the meantime, in FIG. 3, if the media server transmits a 200 OK message to the application server in step S30, the application server immediately transmits an ACK message as a response. However, the application server that receives the 200 OK message from the media server may transmit the ACK message to the media server after step S40 is completed, or immediately after a 183 session progress message is transmitted to the originating terminal in step S40. In addition, when the application server transmits the ACK message to the media server after step S40 is completed, it is possible to omit the step of transmitting an INFO message to the media server by the application server in step S50 and the step of transmitting a 200 OK message as a response to the application server by the media server. In this case, the media server receives an ACK message from the application server, thereby providing early media to the originating terminal.

In the meantime, the terminating terminal that receives the INVITE message from the application server in step S20 thereafter transmits a 180 ringing message, which indicates ringing in response to the reception of the INVITE message, to the application server through the SIP server (step S60). At this time, the corresponding 180 ringing message contains SDP information of the terminating terminal. If the application server that receives the 180 ringing message stores the SDP information of the terminating terminal and transmits a PRACK message to the terminating terminal in response to the 180 ringing message, the terminating terminal transmits a 200 OK message to the application server, thereby performing a response to the PRACK message.

Here, it should be understood that transmission of the 180 ringing message of the terminating terminal is performed in correspondence to the reception of the INVITE message transmitted from the application server, and it should not be understood that step S60 is performed after step S50 because of the appearance of the names of the steps. However, the application server can prepare to provide early media to the originating terminal before receiving the 180 ringing message from the terminating terminal, which can solve a problem that early media cannot be immediately provided to the originating terminal due to a response delay of the terminating terminal when the terminating terminal cannot immediately transmit the 180 ringing message owing to the characteristic of a wireless network.

Thereafter, when the terminating terminal subscriber performs an action for a call connection, such as hooking off the receiver or pressing a communication button and thus the terminating terminal responds to a call connection request of the originating terminal, the application server transmits a termination command to the media server to stop transmitting early media and initiates a regular session for communication between the originating terminal and the terminating terminal (step S70).

If described in steps, the terminating terminal transmits a 200 OK message to the application server corresponding to a response action of the terminating terminal subscriber. At this time, the 200 OK message, which is a response message corresponding to the INVITE message received from the application server in step S20, means the acceptance of the invitation of the originating terminal.

As the terminating terminal subscriber accepts the invitation of the originating terminal, the application server performs a session update process and a service termination process in order to transmit and receive media after a call connection is established between the terminating terminal and the originating terminal.

The application server that receives the 200 OK message as a response to the INVITE message from the terminating terminal transmits an UPDATE message, for initiating a session between the originating terminal and the terminating terminal, to the originating terminal. At this time, the UPDATE message contains the SDP information of the terminating terminal that is stored when the 180 ringing message of the terminating terminal is received.

The originating terminal that receives the UPDATE message from the application server performs a session information update process for media communication with the terminating terminal and transmits a 200 OK message as a response to the UPDATE message to the application server.

In addition, as the terminating terminal subscriber responds to the call connection request of the originating terminal, the application server transmits a BYE message to the media server and requests the media server to stop providing the early media service to the originating terminal. The media server that receives the BYE message stops transmitting the early media to the originating terminal and transmits a 200 OK message as a response to the BYE message to the application server.

Along with the aforementioned operation, the application server transfers a 200 OK message according to the response of the terminating terminal subscriber to the originating terminal, and the originating terminal that receives the 200 OK message transmits an ACK message to the terminating terminal through the application server in response to the 200 OK message.

In this manner, a call connection is established between the originating terminal and the terminating terminal, and thereafter, the originating terminal and the terminating terminal perform media communication corresponding to real communication through the updated session. At this time, the media communication is accomplished through a real-time transport protocol (RTP), and RTP filtering is performed when media are transmitted and received through the session, and thus any media except from the currently communicating counterpart terminal cannot be received.

That is, as described above, when the step of providing early media is switched to the step of transmitting and receiving media, it is probable that early media can be received even after the session is updated or that other media can be received, due to a problem in the network or characteristics of IP traffics. Accordingly, the terminal should be provided with a function for filtering the media.

In addition, when the step of providing early media is switched to the step of transmitting and receiving media, if a null transmission occurs due to a problem in the process of switching, the originating terminal preferably repeats playing back the received early media or performs a still image processing until a real call connection with the terminating terminal according to a regular session is established to solve the null transmission problem occurring according to the session switch.

A method of providing an early media service based on SIP is described above. Although the present invention has been described and illustrated in connection with the specific preferred embodiments, it will be readily understood by those skilled in the art that various changes and modifications can be made thereto without departing from the spirit and scope of the present invention defined by the appended claims.

INDUSTRIAL APPLICABILITY

As described above, according to the method of providing an early media service based on SIP of the present invention, in a case where early media are provided to an originating terminal when a call connection with a terminating terminal is established at the request of the originating terminal, the early media is provided in the form of multimedia data, such as text, image, moving image, flash animation and the like, as well as audio data, and thus users desires are fulfilled and users satisfactions are maximized.

In addition, according to the present invention, with individual operation management of the terminating terminal and the originating terminal according to B2BUA mode operation based on the session initiation protocol and an early session initiation with the originating terminal, an early media service can be normally provided to the originating terminal even when the terminating terminal is in an abnormal operation state.

Further, according to the present invention, due to using a packet network based on the session initiation protocol capable of a plurality of communications with a single circuit, it is advantageous that circuit resources can be efficiently used in providing early media.

Furthermore, according to the present invention, since an early media service is provided through an early session separately from a regular session for transmitting and receiving packets, it is possible to prevent a media blank phenomenon that can occur when the early session is switched to the regular session for transmitting and receiving packets according to a call connection established between the originating terminal and the terminating terminal. In addition, since the originating terminal can independently receive and playback early media regardless of the regular session, sessions can be efficiently and flexibly managed. Also, when an additional terminating capability for processing early media, such as a codec or the like, is required, such an additional terminating capability can be effectively provided.

Moreover, according to the present invention, there is provided a method of providing an early media service for a terminal that does not support an early session, and whether an early session is supported is confirmed before the early media service is provided, whereby the early media service can be provided to the terminal that does not support an early session, through a regular session.

The invention claimed is:

1. A method of providing an early media by an application server during a session initiation protocol (SIP) based call connection between an originating terminal and a terminating terminal, the method comprising:
   receiving an invite message containing a first session description protocol (SDP) information from the originating terminal, and transmitting the invite message to the terminating terminal;
   receiving a 180 ringing message containing a second SDP information from the terminating terminal that receives the invite message, prior to receiving a call response message from the terminating terminal;
   providing the second SDP information to the originating terminal;
   acquiring media information of contents for the early media from a media server, and transmitting a message containing the acquired media information to the originating terminal;
   providing the early media to the originating terminal, using the media server; and
   after receiving the call response message from the terminating terminal, stopping transmitting the early media to the originating terminal and establishing the call between the originating terminal and the terminating terminal.

2. The method in claim 1, wherein the message containing the acquired media information is a 183 Session Progress message.

3. The method in claim 1, wherein the call response message is a 200 OK message.

4. The method in claim 1, wherein the providing the second SDP information is performed before receiving the call response message from the terminating terminal or after receiving the call response message from the terminating terminal.

5. The method in claim 1, wherein the providing the second SDP information is performed during the establishing the call between the originating terminal and the terminating terminal.

6. The method in claim 1, wherein the establishing the call comprises:
   transmitting the call response message to the originating terminal;
   receiving an ack message from the originating terminal; and
   forwarding the ack message to the terminating terminal.

7. The method in claim 1, wherein the acquiring media information is performed before receiving the message containing the second SDP information from the terminating terminal.

8. An application server for providing an early media during a session initiation protocol (SIP) based a call connection between an originating terminal and a terminating terminal, the application server capable of performing:
- receiving an invite message containing a first session description protocol (SDP) information from the originating terminal, and transmitting the invite message to the terminating terminal;
- receiving a 180 ringing message containing a second SDP information from the terminating terminal that receives the invite message, prior to receiving a call response message from the terminating terminal;
- proving the second SDP information to the originating terminal;
- acquiring media information of contents for the early media from a media server, and transmitting a message containing the acquired media information to the originating terminal;
- instructing the media server to provide the early media to the originating terminal; and
- after receiving the call response message from the terminating terminal, stopping transmitting the early media to the originating terminal and establishing the call between the originating terminal and the terminating terminal.

9. The application server in claim 8, wherein the message containing the acquired media information is a 183 Session Progress message.

10. The application server in claim 8, wherein the call response message is a 200 OK message.

11. The application server in claim 8, wherein the providing the second SDP information is performed during the establishing the call between the originating terminal and the terminating terminal.

12. The application server in claim 8, wherein establishing the call comprises:
- transmitting the call response message to the originating terminal;
- receiving an ack message from the originating terminal; and
- forwarding the ack message to the terminating terminal.

13. The application server in claim 8, wherein the providing the second SDP information is performed before receiving the call response message from the terminating terminal or after receiving the call response message from the terminating terminal.

14. The application server in claim 8, wherein the acquiring media information is performed before receiving the message containing the second SDP information from the terminating terminal.

15. A method of providing an early media during a session initiation protocol (SIP) based call connection between an originating terminal and a terminating terminal, the method comprising:
- receiving an invite message containing a first session description protocol (SDP) information from the originating terminal, and transmitting the invite message to the terminating terminal;
- receiving a 180 ringing message containing a second SDP information from the terminating terminal that receives the invite message, prior to receiving a call response message from the terminating terminal;
- providing the second SDP information to the originating terminal, wherein the providing the second SDP information is performed during the establishing the call between the originating terminal and the terminating terminal;
- acquiring media information of contents for the early media, and transmitting a message containing the acquired media information to the originating terminal;
- providing the early media to the originating terminal; and
- after receiving the call response message from the terminating terminal, stopping transmitting the early media to the originating terminal and establishing the call between the originating terminal and the terminating terminal.

16. The method in claim 15, wherein the message containing the acquired media information is a 183 Session Progress message.

17. The method in claim 15, wherein the call response message is a 200 OK message.

18. The method in claim 15, wherein the establishing the call comprises:
- transmitting the call response message to the originating terminal;
- receiving an ack message from the originating terminal; and
- forwarding the ack message to the terminating terminal.

19. The method in claim 15, wherein the acquiring media information is performed before receiving the message containing the second SDP information from the terminating terminal.

* * * * *